Oct. 18, 1932.      C. B. ARNOLD      1,883,454
BOILER FEED WATER REGULATING APPARATUS
Filed Aug. 8, 1930      5 Sheets-Sheet 1

INVENTOR
Charles B. Arnold
BY
Prindle, Bean & Mann
ATTORNEY

Oct. 18, 1932. C. B. ARNOLD 1,883,454
BOILER FEED WATER REGULATING APPARATUS
Filed Aug. 8, 1930 5 Sheets-Sheet 3

Fig. 3.

INVENTOR
Charles B. Arnold
BY
Prindle, Bean & Mann
ATTORNEY

Oct. 18, 1932.   C. B. ARNOLD   1,883,454
BOILER FEED WATER REGULATING APPARATUS
Filed Aug. 8, 1930   5 Sheets-Sheet 4

Fig.4.

INVENTOR
Charles B. Arnold,
BY
Prindle Bean & Mann
ATTORNEY

Oct. 18, 1932.  C. B. ARNOLD  1,883,454
BOILER FEED WATER REGULATING APPARATUS
Filed Aug. 8, 1930   5 Sheets-Sheet 5

INVENTOR
Charles B. Arnold
BY
Prindle, Bean & Mann
ATTORNEY

Patented Oct. 18, 1932

1,883,454

UNITED STATES PATENT OFFICE

CHARLES B. ARNOLD, OF BROOKLYN, NEW YORK

BOILER FEED WATER REGULATING APPARATUS

Application filed August 8, 1930. Serial No. 473,886.

This invention relates to a boiler feed water regulating apparatus adapted to regulate the supply of liquid to the boiler in such a manner as to maintain the level of the liquid within predetermined limits.

Prior feed water regulating devices which are actuated by changes in the liquid level alone are objectionable for the reason that the valves are first caused to close when a sudden increase occurs in the rate of steaming of the boiler, since the change is accompanied by a sudden rise of liquid level in the boiler, and after the sudden rise of liquid level, the level starts to lower for the reason that the boiler is generating more steam than the valve is accommodating at the time. Another undesirable condition to which all feed water regulating devices are subjected and for which prior feed water regulating valves fail to correct is that of fluctuations of pressure in the feed line on the inlet side of the valve. With the rate of steaming of the boiler remaining substantially constant, if there is an increase of pressure ahead of the valve or inlet, more water will be supplied to the boiler than is required. The invention overcomes the aforesaid difficulties and provides a device which operates to substantially maintain the correct level of liquid in a boiler at all times.

An object of this invention is the provision of a device which automatically causes the boiler feed water regulating valve to respond to changes in the rate of steaming of the boiler and changes in feed water pressure, as well as changes of liquid level in the boiler.

Another object of this invention is to incorporate in a single self-contained unit a device which when applied to a feed regulating valve becomes an integral part thereof and which will automatically cause the valve to respond to changes in the rate of steaming, changes in feed line pressure fluctuations and changes in liquid level in the boiler.

To the accomplishment of the foregoing and such other objects as may hereinafter appear, this invention comprises the construction, combination and arrangement of parts hereinafter described and then sought to be defined in the appended claims, reference being had to the accompanying drawings forming a part hereof, and which show merely for the purpose of illustrative disclosure various embodiments of my invention, it being expressly understood, however, that various changes may be made in practice within the scope of the claims without digressing from my inventive idea.

Figure 1:
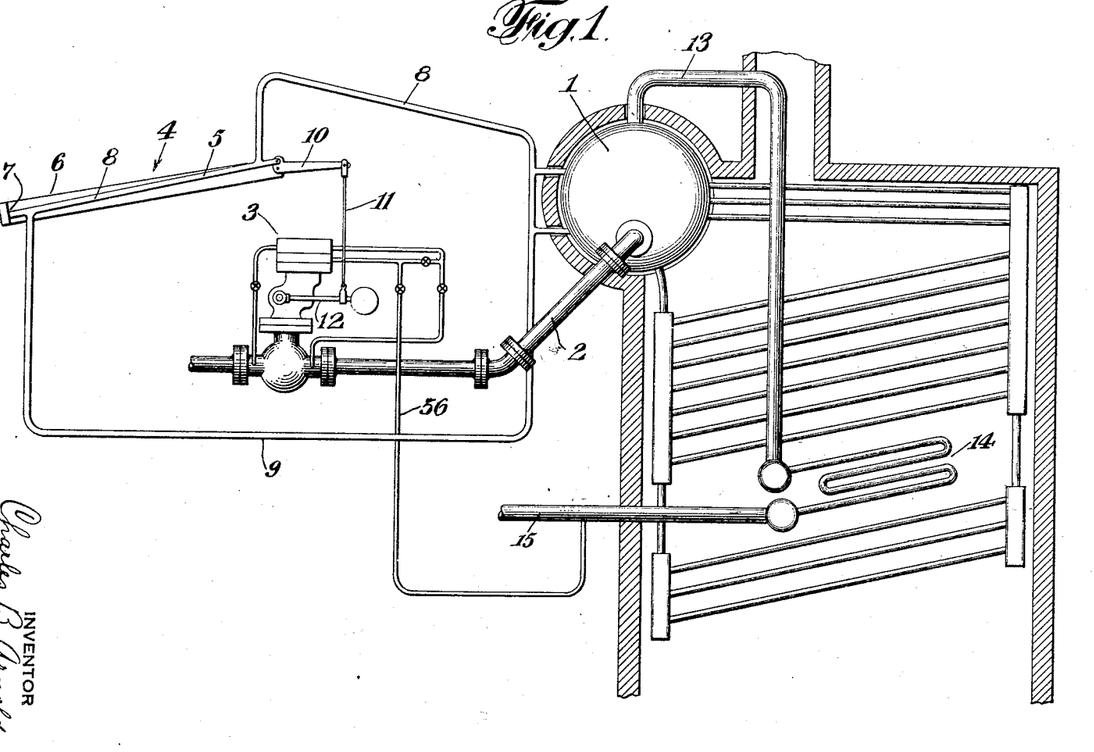
Figure 1 represents a diagrammatic view of a power plant showing one form of a boiler feed water regulating valve, applied to the feed water line of the boiler.

Referring now to the drawings, reference character 1 designates a boiler drum which is supplied with liquid by the feed pipe 2 having a feed water regulating device 3 inserted therein. The usual type of thermostat 4 is used which is actuated by changes of water level in the boiler drum 1. The thermostat comprises a tube 5 mounted in a channel element 6, the tube being rigidly held at one end as at 7 and communicates with the top and bottom portion of the boiler drum by means of tubes or pipes 8 and 9. Pivotally attached to the other or free end of the thermostat tube 5 is a link 10 which has its other end pivotally connected to a rod 11, the rod 11 being connected to lever 12 of the regulating device 3. The steam line or conduit 13 communicates with the top of the boiler drum 1, and is adapted to conduct steam from the boiler drum to superheater 14 and from here the steam line 15 conducts the steam to the place of utilization.

Figure 2:
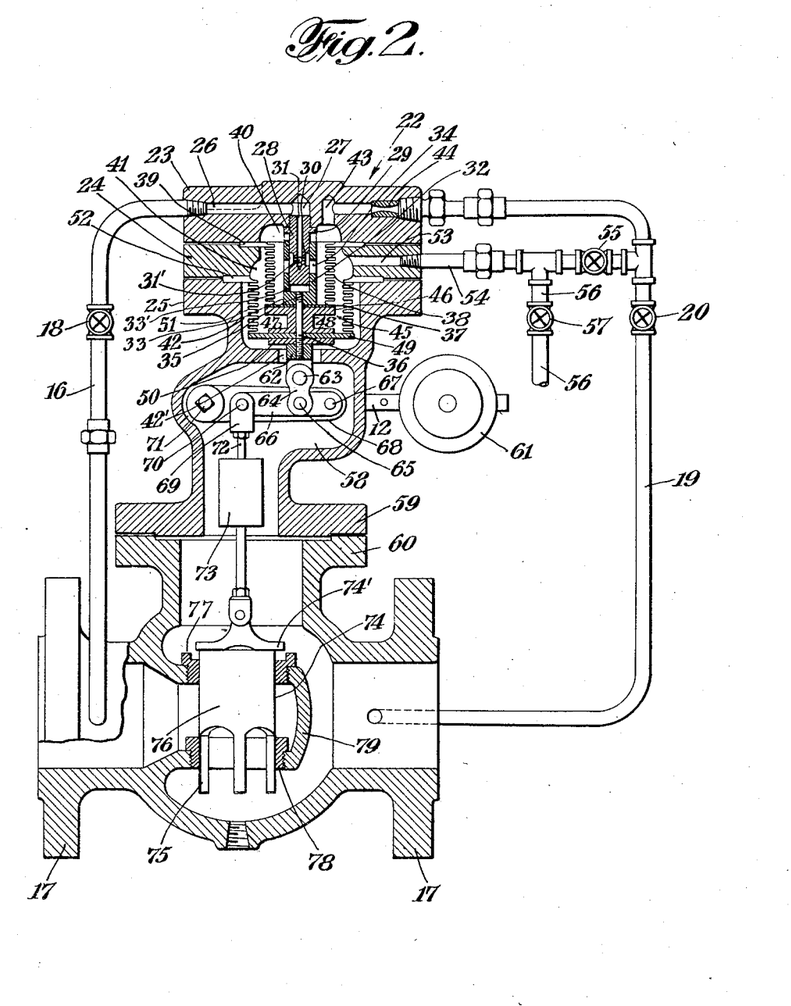
Figure 2 represents a vertical sectional view of one form of the feed water regulating valve in which interconnected bellows are used to correctly position the valve.

Referring to Figure 2, the regulating device will now be described. Pipe 16 is connected and communicates with the interior of the valve casing 17, and is provided with a valve 18. On the discharge side, valve casing 17 communicates with the pipe 19 provided with a valve 20. Pipes 16 and 19 are connected to and communicate with the interior of the housing 22 which comprises three sections 23, 24 and 25, suitably mounted on casing 17. Sections 23, 24 and 25 will be described more fully as the description of the invention proceeds.

Pipe 16 is connected with top section 23 and is in communication with a passageway 26 formed in the top section and which extends from the center of the top section to the outer edge thereof. Communicating with inner end of passageway 26, is a downwardly extending passageway 27 extending substantially at right angles to the passageway 26. A stationary valve cylinder 28 is threaded into passageway 27 until flange 29 abuts the bottom portion of section 23 adjacent the passageway 27. The valve cylinder 28 is provided with an annular groove 30 which communicates with passageway 27 by means of vertical passageway 31 formed in the cylinder and a plurality of openings 31' connecting the passageway 31 with the groove 30, and has a sliding fit with a movable by-pass valve sleeve 32 closed at one end, as at 33, except for the small opening 33', and provided with openings 34 intermediate its ends. The valve cylinder 28 and the valve sleeve 32 are spaced apart longitudinally so as to permit relative movement to take place between the parts. When the annular groove 30 of the valve cylinder 28, and openings 34 of the valve sleeve 32 overlap each other, a by-pass for fluid under pressure therethrough is provided which functions to position the valve correctly.

The closed end 33 of valve sleeve 32 is provided with an opening 35 into which stem 36 is threaded or otherwise secured. The valve sleeve 32 is adapted to rest on plate 37 to which an open ended bellows 38 is secured, the bellows extending upwardly and partially surrounding the valve sleeve 32 and valve cylinder 28. The top of the bellows 38 is suitably secured to an annular plate 39 which is clamped between sections 23 and 24 of the housing 22 so as to be hermetically sealed. Section 23 of the housing 22 is provided with a central depression 40; section 24 is provided with a central opening 41 which is in alinement with central depression 40 of section 23, and section 25 is provided with a central depression 42 which is in alinement with opening 41 and depression 40, the three sections thereby providing a chamber or compartment for the parts of the device now being described. The interior of the bellows 38 and depression 40 of section 23 communicate with a passageway 43 formed in the top section 23 of housing 22 and extending from near the center of top section 23 to the outer edge, the passageway 43 being on the opposite side of the device with respect to passageway 26. Pipe 19 is adapted to be connected to top section 23 and communicates with passageway 43. Interposed between passageway 43 and the end of pipe 19, is a restricted orifice 44 which operates to create a pressure differential on opposite sides thereof. It is to be noted that the valve 20 may be used to compensate for minor corrections in the restricted orifice 44 and so forms a variable orifice construction. It is to be expressly understood, however, that a variable orifice such as a valve may be substituted for the fixed orifice 44. The operation of this orifice will be described more fully when the operation of the invention is given.

The bottom plate 37 is mounted on an integral, apertured spacer member 45 provided with a top portion 46 of approximately the same size as plate 37 and a bottom portion 47 of substantially the same size as plate 37, the top and bottom portions being connected by a sleeve portion 48. The stem 36 is received by the aperture in the spacer member 45. A large bottom apertured plate 49 is clamped and held against bottom portion 47 of the spacer member by means of an apertured disk 50, which is threaded on the lower end of stem 36.

Bellows 51 is of a larger diameter than bellows 38, and is attached to the periphery of bottom plate 49 and extends upwardly and surrounds spacer member 45 and the lower portion of bellows 38. The top portion of bellows 51 is attached to an annular plate 52 which is clamped between sections 24 and 25 of housing 22 so as to be hermetically sealed. A chamber is thus formed surrounding bellows 38 which communicates with passageway 53 formed in section 24, the passageway 53 extending from the central opening 41 in section 24 to the outer edge thereof. Threaded into the outer end of passageway 53 is a pipe 54 connected to pipe 19 and provided with a valve 55. Extending downwardly from pipe 54 is another pipe 56 provided with a valve 57, the pipe 56 being connected and in communication with the steam line 15 to conduct pressure to the interior of the chamber formed by bellows 51. In this embodiment, bellows 51 has an effective area which is twice as large as bellows 38, but it is expressly to be understood that the invention is not restricted to this ratio.

The lower portion of section 25 is provided with a chamber or compartment 58, which is in communication with the central depression 42, of section 25 by means of opening 42', the chamber 58 forming a housing means for the levers to be presently described. The lower end of section 25 is provided with a flange 59 which is mounted on the flanged tubular extension 60 of valve housing 17. Lever 12 is provided with a weight 61 which may be used for counterbalancing purposes.

Threaded on the lower end of the stem 36 and contacting with the disk or plate 50 is a member 62. Pivotally connected to the lower end of the member 62, as at the movable fulcrum 63, is a link 64, the other end of link 64 being pivotally connected, as at the movable fulcrum 65, intermediate the ends of an arm 66, which is pivotally connected at one end, as at the movable fulcrum 67, to an arm 68 and its other end to a link 69, as at 70. Arm 68 is mounted on a fixed pivot 71 in the bottom section 25 of housing 22, the fixed pivot 71 extending through the section 25 and being connected to lever 12 on the exterior of section 25. Lever 12 is actuated by changes in liquid level in the boiler and adjusts the movable fulcrum 67 for changes in the liquid level. Link 64 connected to the bellows is operated thereby, and functions to adjust fulcrum 65. Link 66 connected to both movable fulcrums 67 and 65 provides means for transmitting the combined movement of the two fulcrums to the valve plunger 74, so as to control and regulate the movement of the valve plunger so that the valve plunger feeds the proper amount of water to the boiler.

Link 69 is connected to a valve rod 72, and is provided with a counterweight 73 which functions to counterbalance the syphonic effect of the weight of water in line 56 which weight of water exerts a force to compress bellows 51 and also counterbalance the effect of any pressure on the underneath side of bellows 51 caused by the head of water in conduit 2. The lower end of valve rod 72 is pivotally connected to a hollow cylindrical valve plunger 74 open at both ends and provided with spaced prongs 75 at its bottom portion, the valve plunger being provided with an imperforate cylindrical portion 76 between the upper end and the prongs 75. Valve plunger 74 is slidably received in the annular members 77 and 78 threaded into the annular portion 79 of valve casing 17. The valve plunger 74 is provided with a flanged top 74' which is adapted to be limited in its downward movement by contact with the top of screw threaded member 77.

Figure 3:
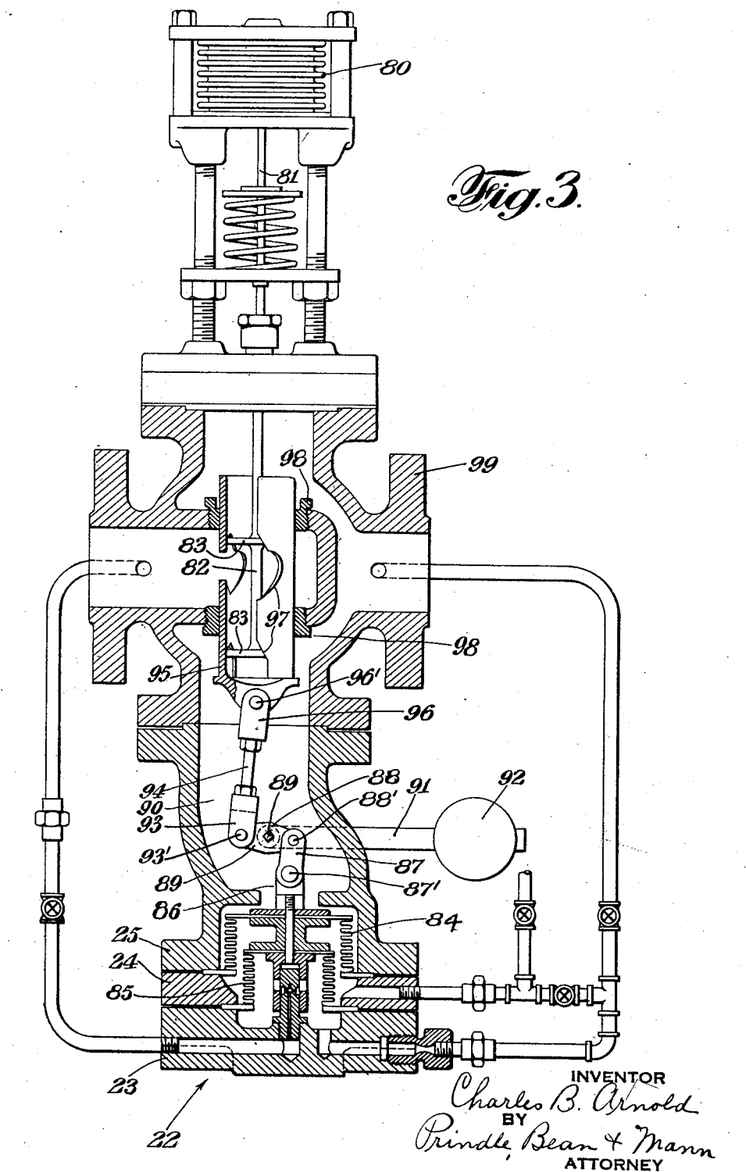
Figure 3 represents a vertical sectional view of another form of a boiler feed water regulating valve, showing the bellows positioned below the valve.

Referring now to Figure 3, which shows my device applied to a bellows actuated, level regulating structure. The bellows 80 is the usual type used in connection with these level regulating devices, which bellows expands or contracts as the water level in the boiler drum lowers or rises, respectively. The bellows 80 is connected directly to a valve rod 81 which has a plunger 82 provided with two pistons 83, so that the expansion or contraction of the bellows causes a movement of the valve plunger. When my device is applied to a bellows actuated regulator as shown, changes in the rate of steaming of the boiler, and changes of feed line pressure, as well as boiler drum water level, are compensated for. The structure of bellows 84 and 85 and the correlated parts are similar to the structure already described in connection with Figure 2. In this modification, however, there is a slight difference in the valve structure and the linkages or interconnections between the valve and the concentric bellows 84 and 85, which will now be described. It is also to be noted that in this modification the bellows 84 and 85 are positioned beneath the valve and are shown reversed as compared with Figure 2.

Connected to the larger bellows 84, is a member 86 on which is pivotally mounted the link 87, as at the movable fulcrum 87', the link 87 being pivotally connected, as at the movable fulcrum 88', with a link 88 which is fulcrumed, as at the fixed fulcrum 89. The fulcrum 89 is mounted in the wall of the chamber 90 formed on section 25 of housing 22, and extends to the exterior thereof, and has mounted thereon a lever 91 provided with a counterbalance weight 92 similar to weight 73 described in connection with Figure 2. Pivoted on the other end of link 88, as at movable fulcrum 93', is a link 93 provided with an arm 94, the arm 94 being connected to the valve cage 95 by means of link 96 pivoted, as at 96'. The cage 95 is a hollow cylinder open at both ends, and provided with a plurality of holes 97. The cage 95 is slidably mounted in the annular portion 98 provided in the valve housing 99. The pistons 83 are received and slidably mounted in the valve cage 95 and by their position permit or prevent the flow of water through the valve housing 99. The bellows 84 and 85 through links and levers 87, 88, 93 and 94, are adapted to adjust valve cage 95 while liquid level responsive bellows 80 actuates rod 81 and pistons 83 located in valve cage 95.

Figure 4:
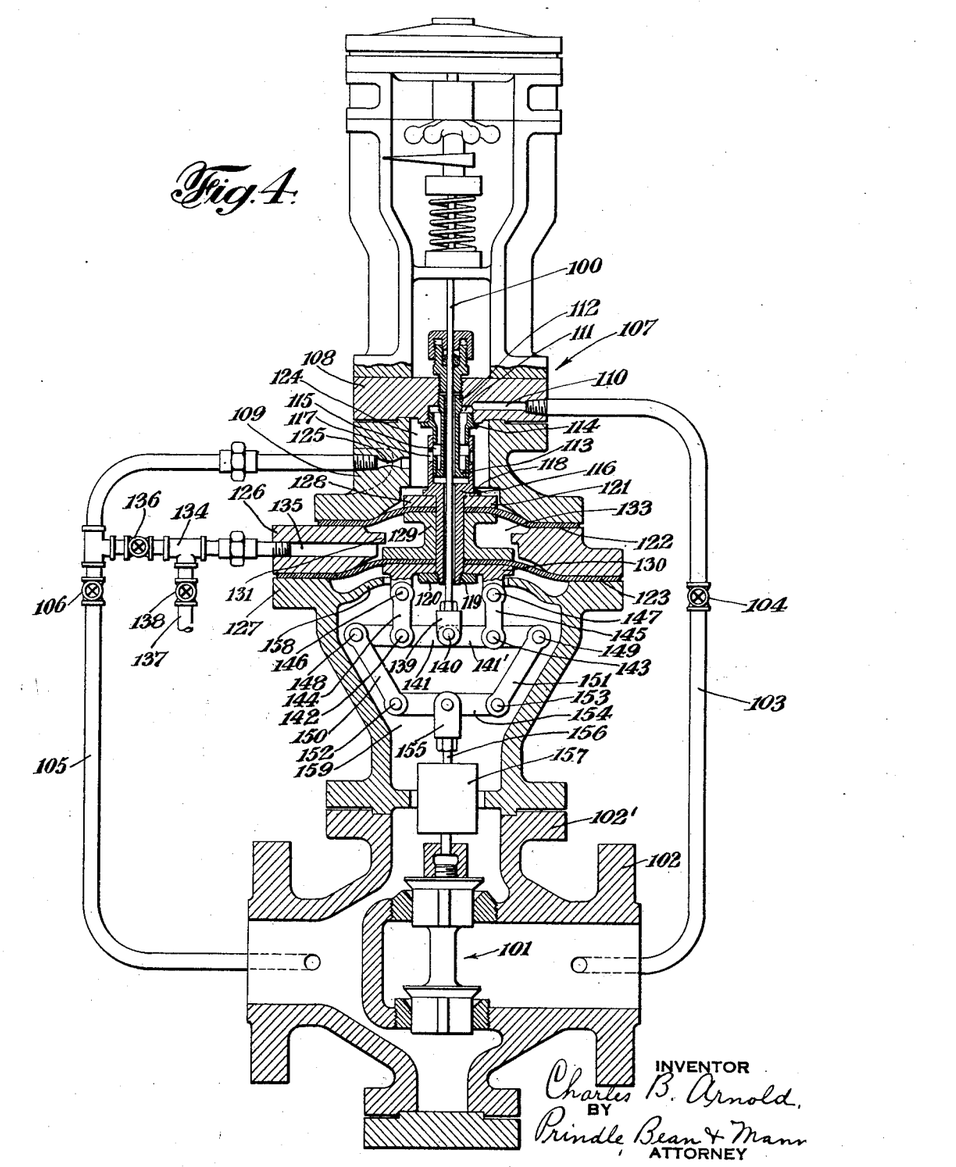
Figure 4 is a partial vertical sectional view showing another form of my invention in which diaphragms are substituted for bellows.

Referring now to Figure 4, a water level regulator is shown which utilizes a diaphragm (not shown) which is actuated by the water level in the boiler to change the position of rod 100 connected to the said diaphragm, the diaphragm operating in the same manner as bellows 80 in Figure 3. The rod 100 is connected to a lever system which operates the valve 101 and which will be later described. On the inlet side the valve casing 102 has a pipe 103 which communicates with the interior of the valve casing and is provided with a valve 104. On the discharge side, the valve casing 102 has a pipe 105 which communicates with the interior of the casing 102 and is provided with valve 106. Pipes 103 and 105 are connected to, and communicate with the interior of a housing 107 which comprises apertured section 108 and annular section 109. Pipe 103 is connected with the top section 108 and communicates with a passageway 110 formed in the top section, and which extends from the center thereof to the outer edge. Top section 108 is provided with a central depression 111 which communicates with passageway 110.

Elongated stationary sleeve 112 is threaded into top section 108 of the housing 107 and forms a guide for rod 100. The sleeve 112 is provided with a flange 113 at its lower end which fits into a larger, concentric, stationary sleeve 114, the larger sleeve being threaded with the central depression 111 in top section 108. The flange 113 functions to prevent the escape of fluid pressure from the by-pass construction to be later described.

The stationary sleeve 114 surrounds and is concentric with elongated sleeve 112 and is threaded into the lower portion of depression 111 and is provided with openings 115. Surrounding said sleeve 114, and having a sliding fit therewith, is an elongated movable sleeve 116 provided with openings 117. Openings 115 and 117 together with pipes 103 and 105 form a by-pass which conducts liquid from one side of the valve housing 102 to the other without passing through the valve housing 102. Sleeve 116 is provided with a flange 118 intermediate its ends and at its lower end is provided with threads 119 adapted to receive a nut 120 for clamping the spacer elements 121 and 129 for the diaphragms 122 and 123 against flange 118. These parts will be more specifically described as the description of the invention proceeds.

Pipe 105 is connected with section 109 and communicates with the interior 124 thereof. Interposed between the interior 124 of the section 109, and the pipe 105 is a restricted orifice 125 which operates to create a pressure differential on opposite sides thereof.

The diaphragm 122 is clamped between annular section 109 and annular section 126. Diaphragm 123 is clamped between annular section 126 and section 127, the central portions of the diaphragms being mounted between the separable sections 128, 129 and 130 of the spacer 121, the spacer being clamped against the shoulder or flange 118, on the sleeve 116, by means of the nut 120. The annular section 126 is provided with an inwardly extending shoulder 131, which limits the upward movement of the spacer section 129. A chamber 133 is, therefore, provided between the two diaphragms 122 and 123 and the annular section 126. A pipe 134 is connected to section 126 and communicates with the passageway 135 which extends from the chamber 133 through the section 126 to the outer edge thereof, and is connected to the pipe 105. The pipe 134 is provided with a valve 136 positioned near the pipe 105. Between the valve 136 and the section 126 is a pipe 137 which extends downwardly from and communicates with pipe 134 and is provided with a valve 138.

Rod 100 is provided with a link 139 which is pivotally connected, as at the movable fulcrum 140, to the adjacent ends of arms 141 and 141', the arms 141 and 141' being pivotally connected, as at the movable fulcrums 142 and 143, adjacent the middle thereof by means of links 144 and 145 which are pivotally connected, as at the movable fulcrums 146 and 147, to the bottom section 130 of spacer member 121. Pivotally connected, as at the movable fulcrums 148 and 149, to the ends of arms 141 and 141' are links 150 and 151 which are pivotally connected, as at the movable fulcrums 152 and 153, to the ends of arm 154. Link 155 is pivoted intermediate the ends of the movable arm 154 and is provided with a rod 156 which carries a counterbalance weight 157 and the valve 101. Section 127 is provided with an annular portion 158 which extends inwardly and forms an abutment means for the lower section 130 of spacer member 121. The lower portion of section 127 is provided with the chamber 159 which is adapted to receive the lever system just described. The lower portion of section 127 is suitably secured to the flanged tubular extension 102' of valve casing 102.

Figures 5, 6:
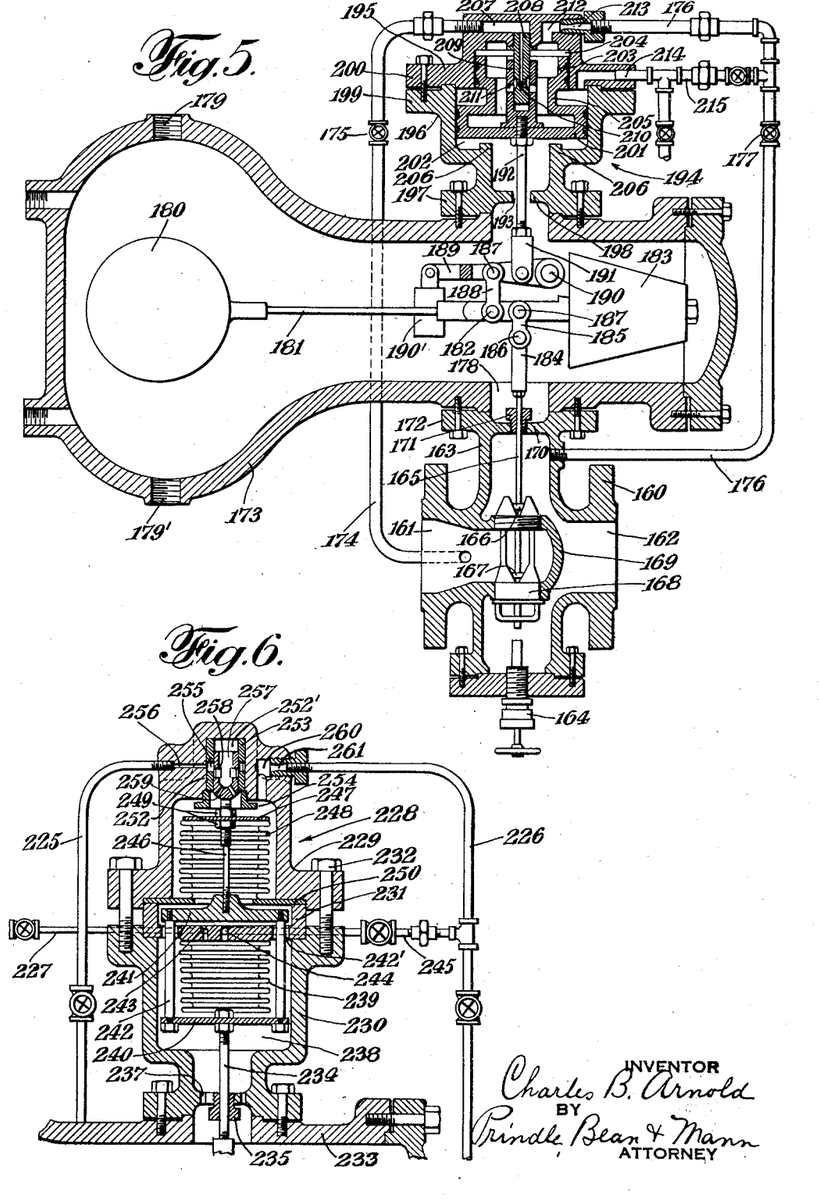
Figure 5 represents a vertical section view of another form of my invention showing a feed water regulating device including pistons, the device being applied to a float actuated valve.
Figure 6 is a vertical sectional view of the upper part of another form of my invention which is adapted to be substituted for the upper part including the pistons shown in Figure 5.

Referring now to Figure 5 which shows a float type boiler feed water regulator, 160 designates a valve casing having an inlet 161 and an outlet 162. A flanged tubular extension 163 extends upwardly from the bottom of the valve casing and is provided at its bottom with a jackscrew 164 which may be used to open the valve. The stem 165 is provided with spaced pistons 166, 167, which are slidably received in the valve cage 168 mounted in an annular interior portion 169 formed in the valve casing 160. The tubular extension 163 is provided with a flat annular portion 170, and has fitted thereon the packing gland 171 in which the stem 165 is slidably mounted. A flange 172 is formed on the top of the tubular extension 163 and is adapted to be secured to the float chamber 173. Pipe 174 having a valve 175 is connected to and communicates with the interior of the inlet side of the valve casing 160. Pipe 176 provided with valve 177 is connected to and communicates with the interior of the outlet side or discharge side of the valve casing 160.

Float chamber 173 is provided with an enlarged opening 178 in its bottom wall which is in alinement with the opening in tubular extension 163 and surrounds stem 165. The float chamber is provided with holes 179 and 179' adapted to receive the necessary connections to a boiler drum respectively above and below normal water level. The float 180 mounted on the float arm 181 is pivoted at the movable fulcrum 182, the float arm being provided with a counterweight 183. An arm 184 is connected to stem 165, and a link 185 is pivotally connected to arm 184, as at the movable fulcrum 186, and also to arm 181, as at the movable fulcrum 187, between the pivot 182 and the counterweight 183. A link 188 is pivotally connected at its one end to float arm 181 at the movable fulcrum 182, and has its other end pivotally connected to arm 189 which is pivoted at one end as at the fixed fulcrum 190. The counterweight 190' is provided on the other end of arm 189. Between link 188 and pivot 190 is a pivoted link 191 provided with a stem 192 which extends through the opening 193 in the top of the float chamber and into the housing 194 comprising two sections, namely, a top section 195, and a bottom section 196 suitably secured together.

A flange 197 is provided at the bottom of lower section 196 which is mounted on the float chamber surrounding the opening 193. An annular abutment 198 formed on the interior of bottom section 196 surrounds the stem 192. A flange 199 is provided on the upper part of lower section 196 which co-operates with the flange 200 on top section 195 for securing the parts together. Stem 192 is connected to the lower large piston 201 received in the cylindrical portion 202 formed in the upper portion of the bottom section 196. The lower piston 201 is formed integral with a smaller upper piston 203, which is slidably received in a cylinder portion 204 formed in the lower portion of top section 195. The two pistons are connected by an integral sleeve portion 205, the pistons forming a structure open at the top and closed at the bottom. The cylinder portion 202 of the lower section 196 is provided with an annular integral flange 206 which limits the downward movement of the lower piston 201. The lower piston 201 has an area twice that of piston 203, but it is to be expressly understood that the relative areas of the pistons may be varied. Float arm 181 swings on fulcrum 182 as a pivot to open and close the valve, and link 188 being connected with pistons 201 and 203, changes the position of fulcrum 182 for each change in the conditions existing in the boiler. In this way the boiler is fed the correct amount of water under varying conditions and a better operation is obtained.

The structure for applying pressures to the pistons is similar to the structure heretofore described in connection with the bellows and diaphragm type of water regulators. The top section 195 is provided with a passageway 207 into which is threaded a stationary valve cylinder 208, which slidably receives a valve sleeve 209 which parts have co-operating holes 210, 211, to allow by-passing of liquid around the valve. A passageway 212 is provided in the top section 195 with a restricted opening 213 which communicates with the outlet pipe 176. The top section is also provided with a passageway 214 and is connected to a pipe 215 adapted to be connected to the steam line and conduct pressure to the cylinder 202. The principle of operation of this modification is the same as the ones previously described. The pistons like the bellows of the other forms are adapted to change the fulcrum of the valve.

Referring now to Figure 6 which shows a top portion including bellows which is adapted to be substituted for the top portion of Figure 5, a valved inlet pipe 225, and a valved outlet pipe 226 are provided. The valved pipe 227 is adapted to conduct pressure into the lower bellows, the structure being similar to the previous structures described. A housing 228 is provided comprising a top section 229, and the bottom section 230. The two sections 229 and 230 are separated by a flanged plate 231 on which the lower bellows is mounted, the sections being suitably secured together as by screws 232. The bottom section 230 of housing 228 is secured to the float chamber 233. Rod 234 extends through the packing gland 235 provided in the bottom portion of the bottom section 230. The bottom of section 230 adjacent the gland 235 is provided with openings 237 for admitting pressure to the exterior of the lower bellows. A chamber 238 is formed in the bottom section 230 and is adapted to form a housing for the lower bellows 239.

Plate 240 is secured to the rod 234 and has bellows 239 secured to the top face thereof. A top plate 241 is provided, the two plates 240 and 241 being connected by bolts 242 which pass through enlarged openings 242' formed in the flanged plate 231. The top of bottom bellows 239 is secured to the bottom of flanged plate 231, the plate being provided with openings and passageways 243 and 244 which communicate with the interior of the bottom bellows 239. Passageway 243 is connected to the pipe 227 which is connected to the steam line and passageway 234 communicates with the outlet valve pipe 226 by a valved pipe 245.

Extending upwardly from the plate 241 is a rod 246 which is threadedly engaged therewith at its bottom end, and which extends at its other end through the plate 247 to which the top bellows 248 is secured. Nuts 249 are threaded on the rod on opposite sides of the plate 247 and are adapted to clamp the plate 247 with the bellows 248 to the rod 246. The bottom of bellows 248 is mounted on an annular flat plate 250 which is clamped between the flanged plate 231 and the top section 229 of the housing 228. The interior of bellows 248 communicates with the exterior of bellows 239 by means of the opening in the annular plate 250 and the enlarged openings 242' formed in the flanged plate 231. It will be noted that in this modification, the bellows have substantially the same areas.

Top section 229 of housing 228 is formed with a cutaway portion 252 to form a chamber which receives a stationary sleeve 253, the sleeve being held in position by the nut 254 threaded into the lower end of the cutaway portion 252. The stationary sleeve is provided with a plurality of holes 255 intermediate its ends. The passageway 256 formed in the top section 229 connects the inlet pipe 225 with the interior of top section 229, the holes 255 formed in the sleeve and the passageway 256 being in alinement.

Slidably received in the valve sleeve to have a sliding fit therewith, is a movable valve plunger 257 which is secured to, and forms a continuation of, the rod 246, the valve plunger being provided with a plurality of openings 258 which are adapted to co-operate with the openings 255 of the valve sleeve to permit the by-passing of liquid, whereby automatic regulation of the valve is obtained. The bottom of the valve plunger is provided with openings 259 which permit communication between the inlet pipe 225 and the exterior of top bellows 248 when openings 258 and 255 are in alinement. The top section 229 is provided with a passageway 260 having a restricted opening 261 similar to the restricted openings described in connection with the other forms of the invention, passageway 260 being in communication with the valved outlet pipe 226.

Referring now to Figure 2, the operation of the device will be described. Assume that valve 55 is closed and that valves 18, 20 and 57 are open. In the above description I have included the counterweight 73 in order to counterbalance the negative head of water in pipe 56. If the valve 3, drum 1, and superheater outlet 15 are all at the same elevation, the need for a counterweight is eliminated. For the purpose of describing my invention, I will, therefore, assume that all of these above named parts are at the same elevation and dispense with the counterweight. Assume further that the boiler is just starting to generate an infinitely small amount of steam. Under these conditions, the required feed water supply to the boiler will be infinitely small, the feed valve plunger 76 will be required to assume an almost closed position in the downward direction and the pressure of the steam at the superheater of the boiler (or some point in the steam line 15) will be substantially the same as the pressure in the boiler drum 1 because of lack of pressure drop at no flow. Since the superheater outlet pressure is the same as the boiler pressure, it will be noted that the differential pressure between the interior and exterior of bellows 51 will be equal to zero. In order that equilibrium may be established between the forces exerted upon bellows 38 and bellows 51 under these conditions, it is necessary that the differential pressure between the interior and the exterior of bellows 38 be also equal to zero. This condition requires that the pressures on the exterior and interior of bellows 38 be equal and that there be no flow through orifice 44 and by-pass lines 16 and 19, thus permitting the interior of bellows 38 to be subjected to the same pressure as that at the outlet of the level regulating valve 17, which is virtually equal to drum pressure, and as above pointed out this drum pressure is equal to the pressure at the superheater outlet. With no flow through the orifice 44, it is necessary that the auxiliary by-pass valve sleeve 32 be in a closed position. It will be noted that if valve sleeve 32 were open it would be immediately closed by the pressure created ahead of orifice 44, acting to expand bellows 38. This condition locates the position regulator and fulcrum 65 in this extreme travel position in a downward direction to close the level regulating valve plunger 76.

If the rate of steaming of the boiler increases, the pressure of the steam at the superheater outlet or some point in the steam line drops below that maintained in the boiler drum, and since the interior of bellows 51 is subjected to the pressure of the superheater, and since the superheater pressure has now decreased, bellows 51 will compress. Due to the direct connection between bellows 51 and valve sleeve 32, compression of bellows 51 will cause the by-pass valve sleeve 32 to be moved upward in an opening direction and thus permit water to be by-passed from the inlet side of the valve housing 17, through pipe 16, through the interior of bellows 38, through orifice 44 and to the discharge side of the valve housing 17 through pipe 19. The flow thus effected increases the pressure on the interior of bellows 38 above boiler drum pressure by an amount equal to the pressure drop across orifice 44 plus the pressure drop through the connecting line 19. Since the exterior of bellows 38 is subjected to the pressure existing in the superheater, bellows 38 is subjected to a differential pressure equal substantially to the pressure drop through the orifice 44 plus the pressure drop of steam in the superheater. When the differential pressure to which bellows 38 is subjected is equal to twice the differential pressure across bellows 51, equilibrium is established, and the device assumes a definite position for this new steaming rate.

When the load on a boiler is increased two conditions result, the water level in the drum is caused to rise momentarily and the pressure drop through the superheater is increased. By means of thermostat 5, (together with levers 10 and 11, arms 12 and 68, fulcrum 67 in arm 68), lever 66 is caused to be moved in a direction to close valve plunger 76 when the water level rises in the drum. However, as pointed out above, fulcrum 65, in the other end of lever 66, is caused to move in a direction to open valve plunger 76. The resultant movement of plunger 76 depends therefore upon the magnitude of the movements of each fulcrum. Plunger 76 is thus caused to open rather than close despite the undesirable rise in water level caused by the swelling of the water in the boiler during an increase in boiler load. For a decrease in load the opposite results, namely, the valve is caused to close despite this lowering of the water level tending to open the valve.

The device also functions to compensate for fluctuations of pressure drop across a level regulating valve. With the rate of steam and the water level substantially constant, an increase of pressure ahead of the valve causes more water to flow through the by-pass valve sleeve 32 and orifice 44, and thereby increases the pressure drop across the orifice. This increase of pressure drop across orifice 44 destroys the equilibrium and causes bellows 38 to expand thus actuating the sleeve 32 in a closing direction so that equilibrium of the forces on the bellows is again established. A closing of the by-pass valve also closes the valve 76 provided the position of arm 12 remains unchanged. It is thus noted that the main valve is caused to close down the proper amount when there is an increase of feed line pressure or vice versa instead of requiring that this correction be made through the medium of a change in water level.

The principle of operation of the other forms of the invention is the same as the one described in connection with Figure 2. In all cases the bellows, diaphragms or pistons co-operate with a liquid level responsive device to accurately position the valve plunger so as to deliver the correct amount of water to the boiler under all conditions. It is to be expressly understood that bellows, diaphragms and pistons can be used in any of the forms shown and the relative sizes of the bellows, diaphragms or pistons in each embodiment may be varied. Each of the forms is adapted to be used with a power plant as shown in Figure 1, but it is to be expressly understood that they are not restricted to use with the power plant shown.

It will be apparent from the above description that a device constructed according to my invention is responsive to changes in the rate of steaming of a boiler, changes in water level, and fluctuations in feed line pressure, and that due to the movable pivots or fulcrums, the device is actuated by their combined movements to supply water to the boiler in accordance with the amount of water required by the boiler at any time.

What I claim is:

1. In combination, a boiler, a liquid conduit and a steam conduit connected therewith, a valve casing in said liquid conduit, a valve in said valve casing, a housing mounted on said casing and provided with an opening which communicates with the discharge side of said casing, a plurality of interconnected pressure responsive means in said housing, means including a restricted orifice connecting one side of said housing to the outlet side of the valve casing and to one side of a pressure responsive means and means connecting the other side of the housing to the inlet side of the valve casing and the same side of said pressure responsive means, by-pass valve means operated by all the pressure responsive means for controlling the pressure of the liquid in the housing on said side of said pressure responsive means for the purpose of effecting response to feed line pressure, means for conducting steam pressure from the steam conduit between the pressure responsive means for the purpose of effecting response to steam flow the other side of the other pressure responsive means being exposed to the pressure existing in the discharge side of valve casing, means for connecting said pressure means to said valve, and means responsive to liquid level changes in the boiler said means co-operating with the pressure responsive means to operate the valve.

2. In combination, a boiler, a vapor conduit and a liquid conduit connected therewith, valve means in said liquid conduit, means for by-passing liquid around the valve means to the boiler, an auxiliary valve in said by-pass means, a restricted orifice in said by-pass means on the discharge side of the auxiliary valve, means for operating the auxiliary valve in response to changes in steam flow from the boiler, said means including interconnected diaphragms, one face of one diaphragm being subjected to the pressure of liquid at the outlet side of the valve, and the other face being subjected to a pressure existing in the vapor conduit, the other diaphragm having one face adjacent the face of the first diaphragm exposed to the pressure existing in the vapor conduit, and having its other face exposed to pressure existing between the auxiliary valve and the restricted orifice, means for connecting said diaphragms to said valve means, and means responsive to liquid level changes in the boiler, said means cooperating with the pressure responsive means to operate the valve.

3. In combination with a boiler, a vapor conduit and a liquid conduit connected to said boiler, a valve casing in said liquid conduit, a valve in said valve casing, a housing on said casing and in communication with said boiler, interconnected pistons in said housing, by-pass means provided with an auxiliary valve for conducting and exerting a liquid pressure on one of the pistons and means for connecting the pistons to the valve, the amount of water passing through the by-pass means being substantially directly proportional to the amount of steam leaving the boiler.

4. In combination, a boiler, a steam conduit and a water conduit connected therewith, a regulating valve in said water conduit, means for by-passing liquid from the inlet to the outlet side of said regulating valve, a by-pass valve in said by-pass means, a restricted orifice on the discharge side of said by-pass valve in the by-pass means, means responsive to changes in the rate of steam flow, means co-operating with said steam flow responsive means and responsive to the differential pressure across said orifice adapted to actuate the by-pass valve, means for actuating the regulating valve in response to changes in position of the by-pass valve and means responsive to changes of water level in the boiler and co-operating with said last-named means for actuating the regulating valve.

5. In combination, a boiler, a steam conduit therefrom, a water conduit thereto, valve means in said water conduit, a by-pass means around said valve means, a by-pass valve in said by-pass means, a restricted orifice on the discharge side of said by-pass valve in the by-pass means, means responsive to the difference of the pressure in the boiler and the pressure at some point in the steam conduit to actuate said by-pass valve, means responsive to the differential pressure across the restricted orifice in the by-pass means to position the by-pass valve, means for actuating the valve means in the water conduit in response to changes in position of the by-pass valve, and a co-operating means responsive to changes of water level in the boiler for also actuating the valve means in the water conduit.

6. In combination, a boiler, a steam conduit therefrom, a steam superheater in said steam conduit, a water conduit to said boiler, valve means in said water conduit, by-pass means around said valve means, a by-pass valve in said by-pass, a restricted orifice on the discharge side of said by-pass valve in the by-pass means, means responsive to the differential pressure across the steam superheater in the steam conduit to actuate said by-pass valve, means responsive to the differential pressure across the restricted orifice in the by-pass means to position the by-pass valve, means for actuating the valve means in the water conduit in response to changes in position of the by-pass valve, and a co-operating means responsive to changes of water level in the boiler for also actuating the valve means in the water conduit.

7. In combination, a boiler, a steam conduit therefrom, a water conduit thereto, valve means in said water conduit, by-pass means around said valve means, a by-pass valve in said by-pass, a restricted orifice on the discharge side of said by-pass valve in the by-pass means, means responsive to the differential pressure across the restricted orifice in the by-pass means to actuate said by-pass valve, means responsive to the rate of steam flow to position the by-pass valve, means for actuating the valve means in the water conduit in response to changes in position of the by-pass valve, and a co-operating means responsive to changes of water level in the boiler for also actuating the valve means in the water conduit.

8. In combination, a boiler, a liquid conduit and a steam conduit connected therewith, a valve casing in said liquid conduit, a valve in said valve casing, a housing mounted on said casing and provided with an opening which communicates with the discharge side of said valve casing, interconnected pressure responsive means in said housing, means connecting one side of said housing to the inlet side of the valve casing and to one side of a pressure responsive means, and means including a variable orifice construction connecting the other side of the housing to the outlet side of the valve casing and the same side of said pressure responsive means, by-pass valve means operated by all the pressure responsive means for controlling the pressure of liquid in the housing on said side of said pressure responsive means, means for conducting steam pressure from the steam conduit to a point between the pressure responsive means, the other side of the other pressure responsive means being exposed to the pressure existing in the discharge side of the valve casing, means for connecting said pressure responsive means to and for the purpose of actuating said valve, and a co-operating means responsive to changes of water level in the boiler for also actuating said valve.

9. In combination, a boiler, a liquid conduit and a steam conduit connected therewith, a valve casing in said liquid conduit, a valve in said valve casing, a housing mounted on said casing and provided with an opening which communicates with the discharge side of said valve casing, two interconnected pressure responsive means in said housing, means connecting one side of said housing to the inlet side of the valve casing and to one side of a pressure responsive means, and means including a restricted orifice connecting the other side of the housing to the outlet side of the valve casing and the same side of said pressure responsive means, by-pass valve means operated by all the pressure responsive means for controlling the pressure of liquid in the housing on said side of said pressure responsive means, means for conducting steam pressure from the steam conduit between the two pressure responsive means, the other side of the second pressure responsive means being exposed to the pressure existing in the discharge side of the valve casing, a counterweight suspended from said pressure responsive means to eliminate the effect of a head of water in the steam pressure conducting means from the steam conduit, means for connecting said pressure responsive means to and for the purpose of actuating said valve, and a co-operating means responsive to changes of water level in the boiler for also actuating said valve.

10. In combination, a boiler, a steam conduit therefrom, a liquid conduit thereto, a valve casing in said liquid conduit, a movable valve cage in said valve casing, a valve piston in said movable valve cage, means for operating said valve piston in response to changes of water level in the boiler, and a means for operating said valve cage in response to changes in the rate of steaming of the boiler, said means comprising a means for by-passing liquid from the inlet to the outlet side of said valve casing, a by-pass valve in said by-pass means, a restricted orifice in said by-pass means in the discharge side of said by-pass valve, means for operating the by-pass valve, said means including interconnected pressure responsive devices, one face of one pressure responsive device being subjected to the pressure at the outlet side of the valve casing, and the other face being subjected to the pressure existing at some point in the steam conduit, the other pressure responsive means having one face adjacent the face of the first pressure responsive means exposed to the pressure existing at the same point in the steam conduit, and having its other face exposed to the pressure existing between the by-pass valve and the restricted orifice, and means for connecting said pressure responsive devices to the movable valve cage.

11. In combination, a boiler, a steam conduit therefrom, a water conduit thereto, a regulating valve in said water conduit, a by-pass means for by-passing liquid from the inlet to the outlet side of said regulating valve, a by-pass valve in said by-pass, a restricted orifice in the discharge side of said by-pass valve in the by-pass means, means responsive to changes in the steam flow to actuate said by-pass valve, means responsive to the differential pressure across the restricted orifice to position the by-pass valve so as to regulate the flow of liquid through the by-pass valve and orifice in a substantially fixed ratio to the rate of steam generation of the boiler, means for actuating the regulating valve in response to changes in position of the by-pass valve, and a co-operating means responsive to changes of water level in the boiler for also actuating the regulating valve.

12. In combination, a boiler, a steam conduit therefrom, a water conduit thereto, a valve casing in said water conduit, a valve means in said valve casing, means comprising links and levers connected to said valve means, said links and levers being actuated in accordance with changes in water level in the boiler about a movable fulcrum, means for actuating said movable fulcrum in response to changes in the amount of steam flowing through the steam conduit, said means comprising a by-pass means for by-passing liquid from the inlet to the discharge side of the valve casing, a by-pass valve in said by-pass means, a restricted orifice on the discharge side of said by-pass valve in the by-pass means, means responsive to the differential pressure between the boiler and some point in the steam conduit connected to and for the purpose of actuating said by-pass valve, means for conducting said differential steam pressure to opposite sides of said responsive means, means responsive to the differential pressure across the restricted orifice also connected to the by-pass valve for the purpose of positioning said by-pass valve, means for conducting said orifice differential pressure to opposite sides of said second responsive means, and means for connecting the by-pass valve and its interconnected pressure responsive means to the aforementioned movable fulcrum.

13. In combination, a boiler, a steam conduit and a water conduit connected therewith, a regulating valve in said water conduit, means for by-passing liquid from the inlet to the outlet side of said regulating valve, a by-pass valve in said by-pass means, a restricted orifice on the discharge side of said by-pass valve in said by-pass means, means responsive to the differential pressure across said orifice adapted to actuate said by-pass valve, means adapted to actuate the regulating valve in response to changes in position of said by-pass valve, and means responsive to changes of water level in the boiler and co-operating with said last named means for actuating the regulating valve.

14. In combination, a boiler, a steam conduit and a water conduit connected therewith, a regulating valve in said water conduit, means for by-passing liquid from the inlet to the outlet side of said regulating valve, a by-pass valve in said by-pass means, a restricted orifice on the discharge side of said by-pass valve in said by-pass means, means responsive to changes in the steam flow, means co-operating with said steam flow responsive means and responsive to the differential pressure across said orifice adapted to actuate said by-pass valve, and means for actuating said regulating valve in response to changes in position of said by-pass valve.

15. In combination with a boiler, a vapor conduit and a liquid conduit connected to said boiler, a valve casing in said liquid conduit, a valve in said valve casing, a housing on said casing and in communication with said boiler, interconnected pistons in said housing, means for connecting said pistons to said valve, by-pass means provided with an auxiliary valve for conducting and exerting a liquid pressure on one of said pistons, means whereby pressure in said vapor conduit may be transmitted to the other piston to actuate said auxiliary valve so that the amount of water passing through said by-pass means is substantially directly proportional to the amount of steam leaving the boiler.

In testimony that I claim the foregoing, I have hereunto set my hand this 6th day of August, 1930.

CHARLES B. ARNOLD.